(12) United States Patent
Li (10) Patent No.: US 8,678,757 B2
(45) Date of Patent: Mar. 25, 2014

(54) VANE OR BLADE FOR AN AXIAL FLOW COMPRESSOR

(75) Inventor: Yan Sheng Li, Lincoln (GB)

(73) Assignee: Siemens Aktiengesellschaft, München (DE)

( * ) Notice: Subject to any disclaimer, the term of this patent is extended or adjusted under 35 U.S.C. 154(b) by 599 days.

(21) Appl. No.: 12/997,037

(22) PCT Filed: Apr. 3, 2009

(86) PCT No.: PCT/EP2009/054025
§ 371 (c)(1),
(2), (4) Date: Dec. 9, 2010

(87) PCT Pub. No.: WO2009/149970
PCT Pub. Date: Dec. 17, 2009

(65) Prior Publication Data
US 2011/0081252 A1 Apr. 7, 2011

(30) Foreign Application Priority Data

Jun. 13, 2008 (EP) ..................................... 08010816

(51) Int. Cl.
*F01D 1/02* (2006.01)

(52) U.S. Cl.
USPC .................... 415/191; 415/208.2; 416/223 A; 416/243; 416/DIG. 5

(58) Field of Classification Search
USPC ....................... 415/191, 192, 208.1–2, 211.2; 416/223 R, 223 A, 243, DIG. 2, DIG. 5
See application file for complete search history.

(56) References Cited

U.S. PATENT DOCUMENTS 6,299,412 B1   10/2001   Wood et al.
6,345,955 B1 *  2/2002   Heffron et al. ................ 415/115

(Continued)

FOREIGN PATENT DOCUMENTS

CN   1126796 A   7/1996
EP   0441097 A1   8/1991

(Continued)

OTHER PUBLICATIONS

Robinson et al., ASME 89-GT-6 ASME Journal of Engineering for gas turbine and power, "Measurement and Calculation of the Three-Dimensional Flow in Axial Compressor Stators, With and Without End-Bends", Apr. 1985, vol. 107. pp. 5-6.
Weingold et al., American Society of Mechanical Engineers, 95-GT-380, "Reduction of Compressor Stator Endwall Losses Through the Use of Bowed Stators", International Gas Turbine and Aeroengine Congress and Exposition, Houston, TX, Jun. 5-8, 1995, pp. 3-4.
Behlke, ASME 85-IGT-9, "The Development of a Second-Generation of Controlled Diffusion Airfoils for Multistage Compressors", Bejing International Gas Turbine Symposium and Exposition, Republic of China, Sep. 17, 1985.
Gallimore et al., ASME GT-2002-30328, GT-2002-30329.
Gallimore et al., GT-2002-30328, "The Use of Sweep and Dihedral in Multistage Axial Flow Compressor Blading, Part 1: University Research and Methods Development", Proceedings of ASME Turbo Expo 2002, Jun. 3-6, Amsterdam, The Netherlands, pp. 1-15.

(Continued)

*Primary Examiner* — Edward Look
*Assistant Examiner* — Juan G Flores (57) ABSTRACT

A compressor vane or compressor blade is provided. The axial flow compressor includes an axial direction, a radial direction, a compressor hub and a compressor casing. The vane or blade includes an airfoil with airfoil sections having a span, a chamber line and a leading edge at which the chamber line includes a leading edge blade angle with the axial direction of the compressor and a trailing edge at which the chamber line includes a trailing edge blade angle with the axial direction of the compressor. The airfoil sections are stacked at the leading edge on a straight line extending along a radial direction of the compressor from the compressor hub towards a compressor casing and in that the leading edge angles of the airfoil sections vary along the span and are larger for airfoil sections close to the hub and close to the wall than for mid-span airfoil sections.

14 Claims, 5 Drawing Sheets

(56) References Cited

U.S. PATENT DOCUMENTS

2001/0036401 A1* 11/2001 Harvey et al. .................. 415/115
2002/0141863 A1   10/2002 Liu et al.

FOREIGN PATENT DOCUMENTS

| | | |
|---|---|---|
| EP | 0704602 B1 | 4/1996 |
| EP | 0833060 B1 | 4/1998 |
| EP | 1098092 A2 | 5/2001 |
| EP | 1259711 B1 | 11/2002 |
| EP | 1505302 A1 | 2/2009 |
| FR | 1002324 | 3/1952 |
| RU | 2219377 C2 | 12/2003 |
| RU | 2228461 C2 | 5/2004 |

OTHER PUBLICATIONS

Gallimore et al., GT-2002-30329, "The Use of Sweep and Dihedral in Multistage Axial Flow Compressor Blading, Part 2: Low and High Speed Designs and test Verifications", Proceedings of ASME Turbo Expo 2002, Jun. 3-6, Amsterdam, The Netherlands, pp. 1-11.

* cited by examiner

VANE OR BLADE FOR AN AXIAL FLOW COMPRESSOR

CROSS REFERENCE TO RELATED APPLICATIONS

This application is the US National Stage of International Application No. PCT/EP2009/054025, filed Apr. 3, 2009 and claims the benefit thereof. The International Application claims the benefits of European Patent Office application No. 08010816.0 EP filed Jun. 13, 2008. All of the applications are incorporated by reference herein in their entirety.

FIELD OF INVENTION

The present invention relates to compressor vanes or blades for axial flow compressors and to an axial flow compressor.

BACKGROUND OF INVENTION

Three-dimensional loss reduction and improving efficiency and stall margin of axial flow compressors are still technical issues in designing compressor blades and vanes. Three-dimensional losses limit the pressure rise capability of the compressor. Such losses result e.g. from flow separation in suction surface, endwall corners, leakage around the tip, and secondary flow regions. Optimising efficiency and stall margin always involves a compromise since increasing efficiency usually reduces stall margins and increasing stall margins usually reduces efficiency.

There are numerous documents which describe approaches to reduce three-dimensional losses and/or to improve efficiency and stall margin.

Axial compressors with end bends have been proposed by Robinson et al., ASME 89-GT-6, D. Wisler, ASME journal of engineering for gas turbine and power, volume 107, April 1985, and R. F. Behlke, ASME 85-IGT-9 in order to improve performance of axial flow compressors. Bowed stator vanes have been proposed by H. Weingold et al., ASME 95-GT-380 for reduction of compressor stator end wall losses. S. Gallimore et al., ASME GT-2002-30328 as well as S. Gallimore et al. GT-2002-30329 have proposed to use airfoil sweep and dihedral in multistage axial flow compressors in order to address the above mentioned issues.

EP 0 441 097 B1 describes a compressor airfoil with bowed leading and trailing edges for reducing aerodynamic losses.

A compressor stator vane with a narrow section between its root and its tip is disclosed in EP 098092 A2. The vane may also be bowed at its trailing edge in cooperation with a narrow waist.

EP 0 704 602 B1 and EP 1 259 711 B1 describe airfoils having a leading edge with a sweep and a straight trailing edge.

EP 0 833 060 B1 describes a blade for an axial fluid machine in which the leading edge is bowed and scalloped and the trailing edge is bowed.

EP 1 505 302 A1 describes a compressor airfoil with at least a bowed leading edge.

U.S. Pat. No. 6,299,412 B1 describes bowed compressor airfoils.

SUMMARY OF INVENTION

With respect to the above mentioned prior art it is a first objective of the present invention to provide an improved compressor blade or vane. It is a second objective of the present invention to provide an improved axial flow compressor.

The first objective is solved by a compressor vane or a compressor blade as claimed in the claims. The second objective is solved by an axial flow compressor as claimed in the claims. The depending claims contain further developments of the invention.

An inventive compressor vane or compressor blade for an axial flow compressor with an axial direction, a radial direction, a compressor hub and a compressor casing comprises an airfoil having airfoil sections with a span, a camber line and a leading edge at which the camber line includes a leading edge blade angle with the axial direction of the compressor, and a trailing edge at which the camber line includes a trailing edge blade angle with the axial direction of the compressor. The airfoil sections are stacked at the leading edge on a straight line extending along a radial direction of the compressor from the compressor hub towards the compressor casing. In addition, the leading edge angles of the airfoil sections vary along the span and the leading edge angles are larger for airfoil sections close to the hub (0% span) and close to the casing (100% span) than for mid-span airfoil sections. In particular, the leading edge blade angles may be up to 10° larger for airfoil sections close to the hub and up to 18° larger for airfoil sections close to the casing wall than for mid-span airfoil sections.

In the current invention 3D CFD code has been used to set the leading edge and trailing edge blade angles. The code has also been used to customise the airfoil profile shape and the stacking of the airfoil sections. Thereby, losses have been minimised and flow ranges have been improved. The increased leading edge blade angles close to the hub and close to the casing of the compressor help to reduce large positive incidences induced by viscous three-dimensional flows in these regions and hence help to reduce blade surface boundary layer thickness and flow separation towards the trailing edge. The increased blade angles and reduced incidences also help to reduce tip leakage flows in the casing region of rotor blades and in the hub region of cantilevered stator vanes. The reduced leading edge blade angles in the mid-span region help to maintain an adequate choke margin. In addition, the leading edge stacking on a radial straight line helps to produce more compound (curved) lean towards a trailing edge with a pressure surface facing the hub and casing. This helps to relieve blade loading in the end wall regions and hence to reduce tip leakage flows where there is a tip clearance, and to reduce suction surface-end wall corner flow separations, and thus helps to reduce three-dimensional loss and to improve stall margin.

The inventive vane may also comprise a trailing edge in which the trailing edge angles of the airfoil section vary and the trailing edge angles are larger for airfoil sections close to the hub and/or close to the casing than for mid-span airfoil sections. The variation in the trailing edge angles of the airfoil sections may be smaller than the variation in the leading edge angles of the airfoil sections. In particular, the trailing edge blade angles may be up to 5° larger for airfoil sections close to the hub and up to 10° larger for airfoil sections close to the casing than for mid-span airfoil sections.

The mentioned trailing edge angle design helps to relieve local blade or vane loading and hence helps to reduce suction surface end wall corner flow separation in the end wall regions of the blade or vane, i.e. in the hub region or the casing region.

For cantilevered stator vanes the trailing edge blade angles in the hub region can be kept similar to conventional stator vanes as the tip leakage flow helps to relieve the loading in these regions. In addition, the trailing edge blade angles of rotor blades in the casing region can be kept similar to conventional design since also in this case tip leakage flow helps to relieve the loading in the casing regions.

The trailing edge blade angles in mid-span region can be kept similar to conventional designs if the change in trailing edge blade angle with respect to the conventional design is small in the end wall regions or reduced if the trailing edge blade angles are increased in the end wall regions.

It is particularly advantageous if the leading edge blade angles and/or the trailing edge blade angles of the airfoil sections are the largest towards the casing. Furthermore, the increases in leading edge blade angles and/or trailing edge angles of the airfoil sections relative to mid-span airfoil sections are advantageously the largest towards the casing. The minimum of the leading edge angles and/or the trailing edge angles of the airfoil sections may, in particular, be between 30% and 70% span of the airfoil. In a special implementation of the inventive stator vane or rotor blade the trailing edge is curved.

The disclosed treatments of the trailing edge blade angles in the mid-span region helps to maintain the overall loading of the rotor blades or stator vanes relative to the conventional rotor blades or stator vanes.

An inventive axial flow compressor comprises inventive blades and/or vanes. With the inventive blades and/or vanes the performance of the compressor can be improved due to reduced three-dimensional losses, improved efficiency, and an increased stall margin.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
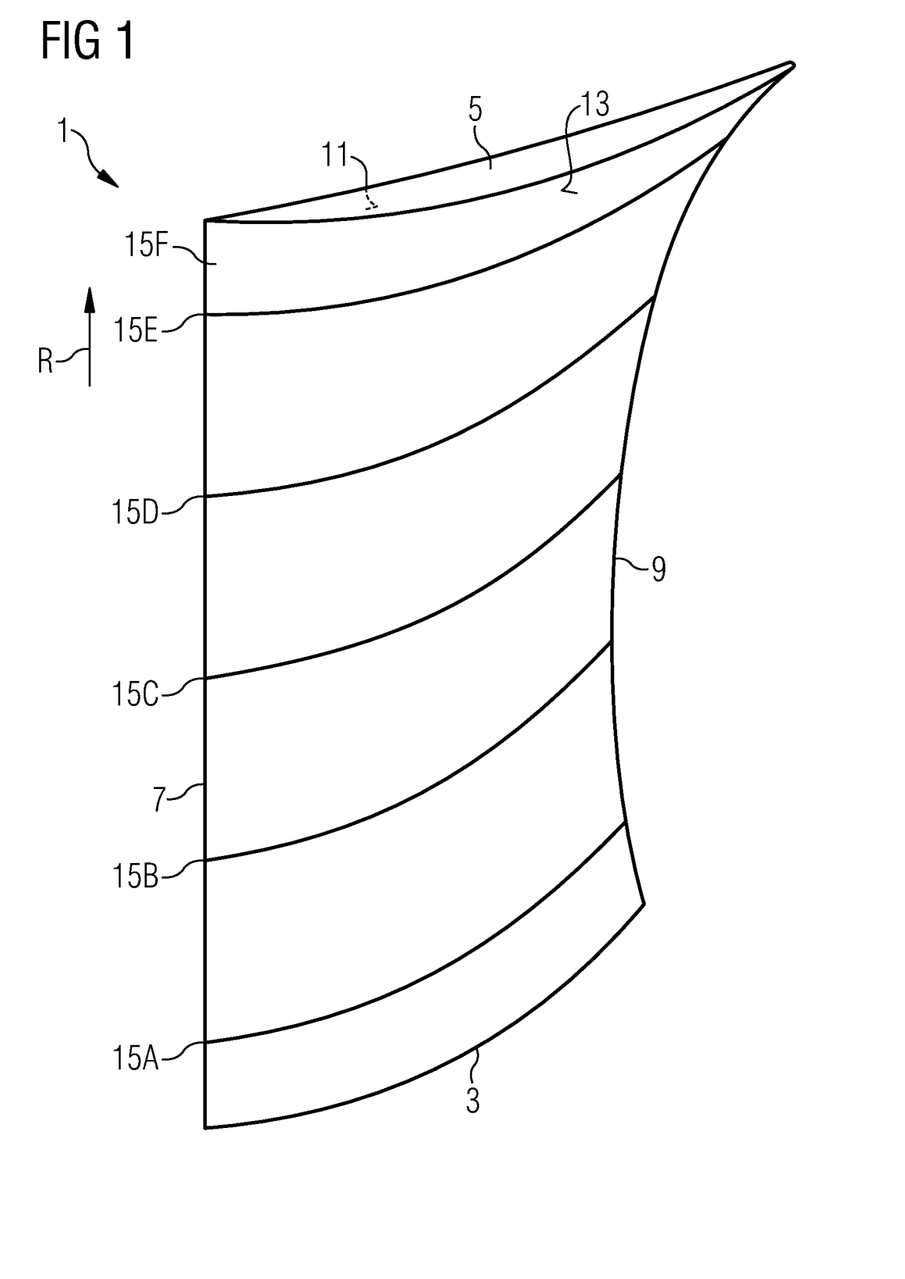
FIG. 1 shows an inventive airfoil in a three-dimensional view.

An airfoil using the features of the invention is shown in FIG. 1 in a three-dimensional view. The features noticeable in FIG. 1 can, in general, be used for the airfoils of compressor rotor blades as well as the airfoils of compressor stator vanes.

The airfoil 1 comprises a hub section 3 which shows towards the rotor when the airfoil is incorporated in a compressor, and a casing section 5 which shows towards the compressor casing when the airfoil 1 is incorporated into a compressor. It further comprises a leading edge 7 and a trailing edge 9 which both extend from the hub section 3 to the casing section 5. While the leading edge follows a straight line extending in radial direction R of the compressor the trailing edge 9 is curved with respect to the radial direction of the compressor. The trailing edge 9 may, in addition, be curved with respect to the axial direction of the compressor, too. Between the leading edge 7 and the trailing edge 9 extends a pressure surface 11 and a suction surface 13 which lead to a momentum transfer to the airfoil in case the airfoil is part of a movable rotor blade, or to the flowing air if the airfoil is part of a stator vane.

Also shown in FIG. 1 are notional airfoil sections 15A to 15E which are used for defining the airfoil design. However, these airfoil sections are only part of the design process and are used for defining the design without being present as individual elements in a real airfoil.

Figure 2:
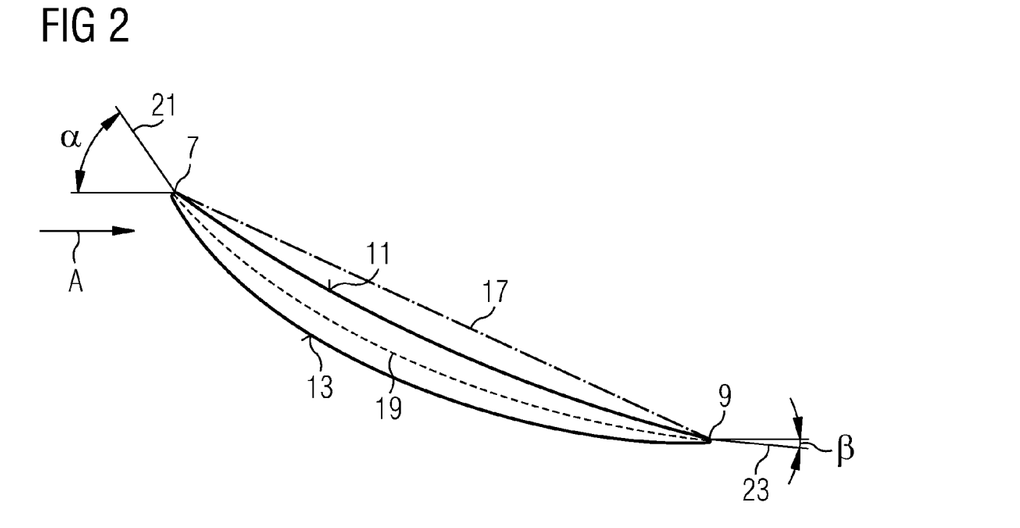
FIG. 2 shows parameters of the airfoil of FIG. 1 which are important for understanding the invention.

Some parameters, which are important for describing the inventive airfoil design, will be explained with respect to FIG. 2 which shows a section through the mid-span section of the airfoil 1 along the compressor's axial direction, i.e. perpendicular to the airfoil span. The figure shows the chord 17, which is a notional straight line connecting the leading edge 7 to the trailing edge 9. A further notional line connecting the leading edge 7 and the trailing edge 9 is the camber line 19 which extends in the middle between the pressure surface 11 and the suction surface 13. A leading edge angle $\alpha$ is defined as the angle between the axial direction A of the compressor and the tangent 21 of the camber line 19 at the leading edge 7. Likewise, a trailing edge angle $\beta$ is the angle between the axial direction A and the tangent 23 of the camber line 19 at the trailing edge 9.

Figure 3:
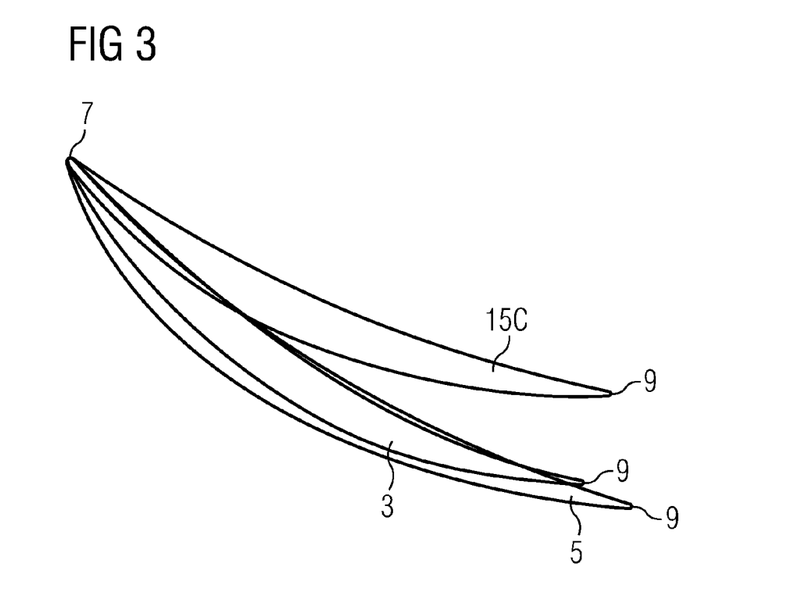
FIG. 3 shows three sections of the airfoil shown in FIG. 1 taken along the axial direction of the compressor.
Figure 4:
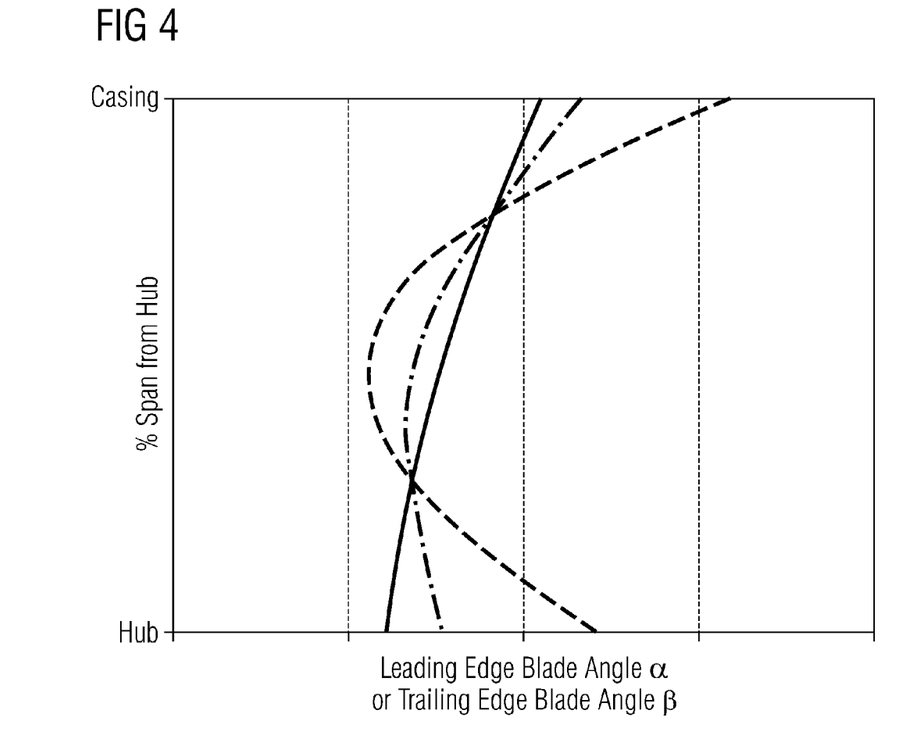
FIG. 4 shows the distribution of the leading edge blade angle and the trailing edge blade angle of the inventive airfoil along its span in comparison with the distribution of leading edge blade angles of a conventional airfoil.

In the inventive airfoil, the leading edge angle $\alpha$ varies along the airfoil's span, as it is shown in FIGS. 3 and 4. FIG. 3 shows a sectional view along the axial direction A through three airfoil sections of FIG. 1, namely the airfoil hub section 3 the airfoil casing section 5, and the airfoil section 15C, which is a mid-span airfoil section.

As can be seen from FIGS. 1 and 3, the airfoil sections 3, 5, and 15A-E are stacked at the leading edge 7 along a straight line extending in radial direction R. As can be also seen from the figures, the leading edge angle $\alpha$ of the blade varies along the span, as does the trailing edge angle $\beta$.

The variation of the leading edge angle $\alpha$ in the inventive airfoil along the span is shown in FIG. 4 as a dashed line. For comparison reasons, the leading angle $\alpha$ along the span is also shown for a conventional airfoil (solid line). It can be seen that, compared to the conventional airfoil, the leading edge angle of the inventive airfoil varies much stronger than the leading edge angle of a conventional airfoil. Not only are the leading edge angles of the inventive airfoil larger than in the conventional airfoil close to the hub and close to the casing but the leading edge angle is also smaller than in a conventional airfoil in mid-span sections. If the trailing edge angle $\beta$ of the inventive blade varies it may vary as indicated by the dash-dotted line in FIG. 4. Usually the variation of the trailing edge angle would be smaller than the variation of the leading edge angle relative to conventional design. This is particularly the case for a rotor blade. However, for the inventive stator vane the magnitude of trailing edge blade angle variation relative to the conventional design can be similar to that of the leading edge angles.

The dash-dotted line shows a variation in which the trailing edge angle is the smallest in the mid-span region of the airfoil. However, the variation of the trailing edge angle could also follow more or less the variation of the conventional airfoil, i.e. the trailing edge angle at the hub section could be smaller than the trailing edge angles in the mid-span sections, particularly for a rotor blade.

Figure 5:
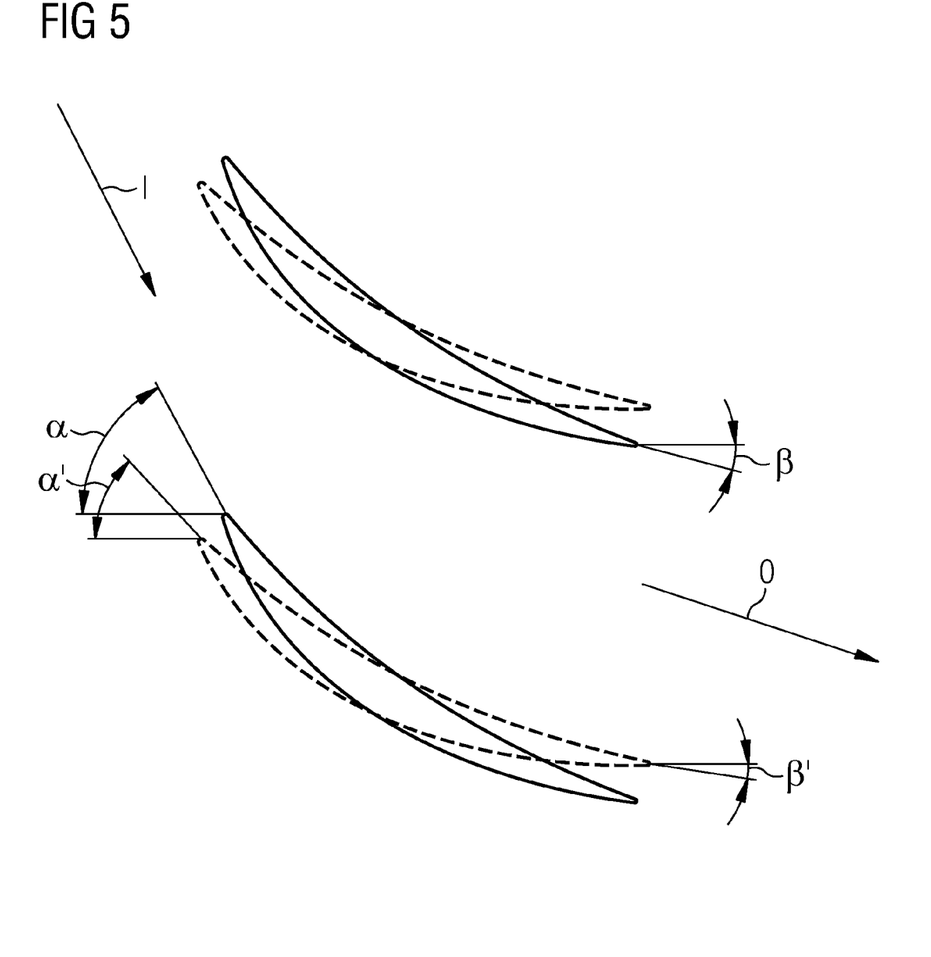
FIG. 5 shows a comparison between the inventive airfoil and a state of the art airfoil.

A comparison of the leading edge angles α, α' and the trailing edge angles β, β' of the inventive airfoil and a conventional airfoil for the airfoil's casing sections is shown in FIG. 5. The figure also shows the inflow I and the outflow O direction of the air to be compressed. As can be seen in FIG. 5, both the leading edge angle α and the trailing edge angle β of the inventive airfoil are larger than the leading edge angle α' and the trailing edge angle β', respectively, of the conventional airfoil. A similar illustration would result from a comparison between the hub sections of the inventive airfoil and a conventional airfoil. The increased leading edge blade angles in the hub and casing sections help to reduce large positive incidences induced by the viscous three-dimensional airflow in these regions. By this measure the thickness of the blade surface boundary layer and the flow separation towards the trailing edge of the blade can be reduced. In addition, the increased blade angles and the reduced incidences also help to reduce tip leakage flows in the casing region of rotor blades and in the hub region of cantilevered stator vanes. The reduced leading edge blade angles, as compared to conventional rotor blades, in the mid-span region helps to maintain an adequate choke margin.

Figure 6:
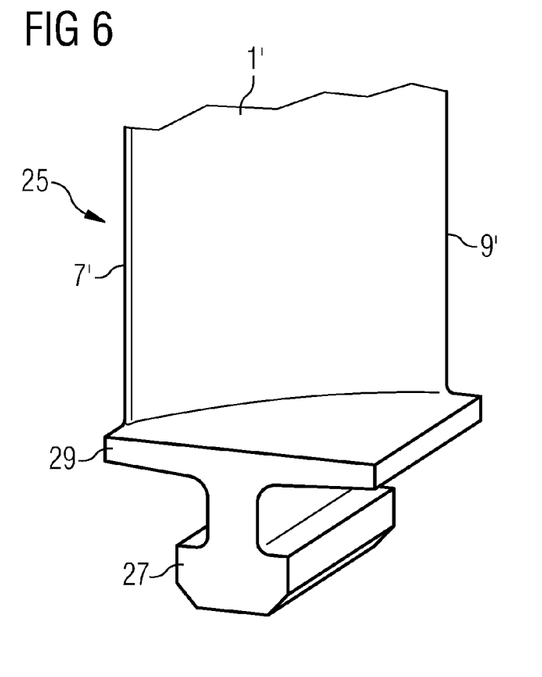
FIG. 6 shows an inventive compressor rotor blade using the inventive airfoil.

FIG. 6 shows an example for an inventive rotor blade with an airfoil as described above. The rotor blade 25 comprises an inventive airfoil 1', a root 27, and a platform 29 located between the airfoil 1' and the root 27. As can be seen, the airfoil sections of the blade's airfoil 1' are stacked on a straight leading edge. In addition, the trailing edge 9' only shows a small variation in the radial direction. In fact, the trailing edge angle is kept similar to the trailing edge angles of conventional rotor blade designs if there is no flow separation. If, on the other hand, there are flow separations towards the trailing edge in the rotor hub and the rotor casing region, the trailing edge angles in these regions may be increased. In the mid-span region, the trailing edge blade angles can be kept similar to conventional designs if there is little change in the hub and the casing sections. If, on the other hand, the trailing edge blade angles are increased in the end wall regions, i.e. in the hub region and the casing region, the trailing edge angles may be reduced with respect to the trailing edge angles of conventional designs in the mid-span regions. However, even if the trailing edge blades angle of the blade 25 vary, they vary not as much as the leading edge blade angles relative to the conventional design.

Figure 7:
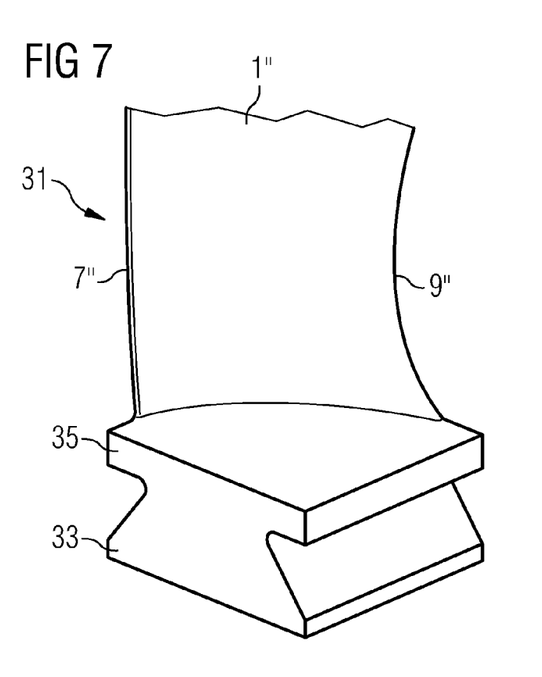
FIG. 7 shows a compressor stator vane using the inventive airfoil.

An inventive stator vane is shown in FIG. 7. It comprises an airfoil 1" according to the invention with a straight leading edge 7" extending in radial direction and a curved trailing edge 9", a root 33, and a platform 35 located between the airfoil 1" and the root 33. The stator vane shown in FIG. 7 is a cantilevered stator vane. As can be easily seen from FIG. 7, the leading edge 7" of the airfoil 1" extends along a straight line in radial direction while the trailing edge 9" is curved. Please note that the invention is also applicable to shrouded stator vanes, which are not shown here.

The trailing edge blade angles of the cantilevered stator vane shown in FIG. 7 can be kept similar to the conventional stator vane design trailing edge blade angles if there is no local flow separation, or increased if there are flow separations towards the trailing edge in the hub region or the casing region. In case of shrouded stator vanes the trailing edge blade angles can be kept similar to the conventional design trailing edge blade angles towards the hub and the casing if there is no local flow separation, or increased if there are flow separations towards the trailing edge in the hub and the casing region. Like in the case of the rotor blades, the trailing edge blade angles can be kept similar to conventional designs in the mid-span region if there is little change in the trailing edge blade angles in the hub region or the casing region, or reduced if the trailing edge blade angles are increased in the hub region and/or the casing region.

Please note that in the context of the current invention the compressor airfoils can have any profile shape, e.g. customised controlled-diffusion airfoil, double-circular-arcs (DCA), C4 airfoil, et cetera.

The inventive airfoil design for compressor rotor blades and compressor stator vanes as described above helps to reduce three-dimensional losses and to improve efficiency and stall margin of axial flow compressors without substantially increasing the loading of the rotor blades or stator vanes.

The invention claimed is:

1. A compressor stator vane or compressor rotor blade for an axial flow compressor wherein the axial flow compressor includes an axial direction, a radial direction, a compressor hub, and a compressor casing, the stator vane or rotor blade comprising:

an airfoil with a plurality of airfoil sections including a span, a camber line and a leading edge at which the camber line includes a leading edge blade angle with the axial direction of the compressor and a trailing edge at which the chamber line includes a trailing edge blade angle with the axial direction of the compressor, wherein the plurality of airfoil sections are stacked at the leading edge on a straight line extending along the radial direction of the compressor from the compressor hub towards a compressor casing, and wherein the leading edge blade angle of the plurality of airfoil sections varies along the span and the leading edge blade angle is larger for the plurality of airfoil sections close to the compressor hub and close to the casing than for mid-span airfoil sections, wherein the trailing edge blade angle of the plurality of airfoil sections varies along the span and the trailing edge blade angle is larger for airfoil sections close to the compressor hub and/or close to the casing than for mid-span airfoil section, and wherein a first variation in the trailing edge blade angle of the airfoil sections is smaller than a second variation in the leading edge blade angle of the airfoil sections.

2. The stator vane or rotor blade as claimed in claim 1, wherein the leading edge blade angle of the plurality of airfoil sections is the largest towards the casing.

3. The stator vane or rotor blade as claimed in claim 1, wherein a first increase in leading edge blade angle of the plurality of airfoil sections relative to mid-span airfoil sections are the largest towards the casing.

4. The stator vane as claimed in claim 1, wherein the trailing edge blade angle of the airfoil sections are the largest towards the casing.

5. The stator vane as claimed in claim 1, wherein a second increase in the trailing edge blade angle of the airfoil sections relative to mid-span airfoil sections are the largest towards the casing.

6. The stator vane or rotor blade as claimed in claim 1, wherein the leading edge blade angle of the airfoil sections of the stator vanes or the rotor blades and/or the trailing edge blade angle of the airfoil sections of the stator vanes include a minimum between 30% and 70% span of the airfoil.

7. The stator vane or rotor blade as claimed in claim 1, wherein the trailing edge is curved.

8. An axial flow compressor including an axial direction, a radial direction, a compressor hub, and a compressor casing, comprising:
- a plurality of stator vanes or rotor blades, each comprising:
  - an airfoil with a plurality of airfoil sections including a span, a camber line and a leading edge at which the camber line includes a leading edge blade angle with the axial direction of the compressor and a trailing edge at which the chamber line includes a trailing edge blade angle with the axial direction of the compressor,
- wherein the plurality of airfoil sections are stacked at the leading edge on a straight line extending along the radial direction of the compressor from the compressor hub towards a compressor casing,
- wherein the leading edge blade angle of the plurality of airfoil sections varies along the span and the leading edge blade angle is larger for the plurality of airfoil sections close to the compressor hub and close to the casing than for mid-span airfoil sections,
- wherein the trailing edge blade angle of the plurality of airfoil sections varies along the span and the trailing edge blade angle is larger for airfoil sections close to the compressor hub and/or close to the casing than for mid-span airfoil section, and
- wherein a first variation in the trailing edge blade angle of the airfoil sections is smaller than a second variation in the leading edge blade angle of the airfoil sections.

9. The compressor as claimed in claim 8, wherein the leading edge blade angle of the plurality of airfoil sections is the largest towards the casing.

10. The compressor as claimed in claim 8, wherein a first increase in leading edge blade angle of the plurality of airfoil sections relative to mid-span airfoil sections are the largest towards the casing.

11. The compressor as claimed in claim 8, wherein the trailing edge blade angle of the airfoil sections are the largest towards the casing.

12. The compressor as claimed in claim 8, wherein a second increase in the trailing edge blade angle of the airfoil sections relative to mid-span airfoil sections are the largest towards the casing.

13. The compressor as claimed in claim 8, wherein the leading edge blade angle of the airfoil sections of the stator vanes or the rotor blades and/or the trailing edge blade angle of the airfoil sections of the stator vanes include a minimum between 30% and 70% span of the airfoil.

14. The compressor as claimed in claim 8, wherein the trailing edge is curved.

* * * * *